United States Patent [19]
Enstrom et al.

[11] Patent Number: 5,768,542
[45] Date of Patent: Jun. 16, 1998

[54] METHOD AND APPARATUS FOR AUTOMATICALLY CONFIGURING CIRCUIT CARDS IN A COMPUTER SYSTEM

[75] Inventors: Mark R. Enstrom, Redmond; Ralph L. Lipe, Woodinville; David W. Voth, Redmond; Robert T. Short, Kirkland, all of Wash.; Narendar B. Sahgal, Beaverton, Oreg.; Ajay V. Bhatt, Eldorado Hills, Calif.; Philip W. Martin, Banks; Sudarshan Bala Cadambi, Portland, both of Oreg.

[73] Assignee: Intel Corporation, Santa Clara, Calif.

[21] Appl. No.: 774,998

[22] Filed: Dec. 27, 1996

Related U.S. Application Data

[63] Continuation of Ser. No. 255,359, Jun. 8, 1994, abandoned.

[51] Int. Cl.$^6$ .................... G06F 13/12; G06F 13/14
[52] U.S. Cl. ......................... 395/284; 395/828
[58] Field of Search ....................... 395/280, 281, 395/282, 283, 284, 828, 829, 830

[56] References Cited

U.S. PATENT DOCUMENTS

| | | | |
|---|---|---|---|
| 4,360,820 | 11/1982 | McVey | 395/829 |
| 4,660,141 | 4/1987 | Ceccon et al. | 395/829 |
| 4,773,005 | 9/1988 | Sullivan | 395/829 |
| 4,910,655 | 3/1990 | Ashkin et al. | 395/829 |
| 4,912,627 | 3/1990 | Ashkin et al. | 395/829 |
| 4,991,085 | 2/1991 | Pleva et al. | 326/82 |
| 5,014,193 | 5/1991 | Garner et al. | 395/282 |
| 5,038,320 | 8/1991 | Heath et al. | 395/830 |
| 5,056,060 | 10/1991 | Fitch et al. | 395/823 |
| 5,111,423 | 5/1992 | Kopec, Jr. et al. | 395/500 |
| 5,161,102 | 11/1992 | Griffin et al. | 395/800 |
| 5,175,536 | 12/1992 | Aschliman et al. | 340/825.04 |
| 5,257,387 | 10/1993 | Richek et al. | 395/800 |
| 5,263,148 | 11/1993 | Jones et al. | 395/500 |
| 5,299,322 | 3/1994 | Arai et al. | 395/830 |
| 5,317,693 | 5/1994 | Cuenod et al. | 395/829 |
| 5,367,640 | 11/1994 | Hamilton et al. | 395/830 |
| 5,418,960 | 5/1995 | Munroe | 395/830 |
| 5,530,895 | 6/1996 | Enstrom | 395/829 |

*Primary Examiner*—Ayaz R. Sheikh
*Attorney, Agent, or Firm*—Blakely, Sokoloff, Taylor & Zafman

[57] ABSTRACT

A method and apparatus for automatically configuring circuit cards used in a computer system. The present invention includes a method and apparatus that enables the circuit cards to be automatically configured during system boot up without any user intervention. The present invention also includes a method for the computer system software to detect resources requested by the circuit cards in order to resolve any system resource conflicts.

20 Claims, 10 Drawing Sheets

METHOD AND APPARATUS FOR AUTOMATICALLY CONFIGURING CIRCUIT CARDS IN A COMPUTER SYSTEM

This is a continuation of application Ser. No. 08/255,359, filed Jun 8, 1994, now abandoned.

BACKGROUND OF THE INVENTION

1. Field of the Invention

This invention relates to a computer system. More specifically, the field of the present invention is that of a computer system having bus and the ability to automatically configure circuit cards that are coupled to the bus.

2. Related Art

Computers and their associated bus architecture and protocol establish a framework upon which other items like integrated circuits and add-on circuit cards are based. The bus and bus controller provide a medium for the computer to communicate with the peripherals coupled to the bus. The Industry Standard Architecture (ISA) bus is an example of a bus architecture widely used in the computer industry as a standard bus expansion in most personal computers (PCs).

This bus architecture requires the allocation of system resources like memory, input/output (I/O) address spaces, Direct Memory Access (DMA) channels, and interrupt levels among multiple ISA cards. The ISA interface however, does not have any defined hardware or software mechanism for allocating these resources. As a result, configuration of ISA cards (circuit cards) is typically done with hardware jumpers. This procedure changes the decode maps for memory and I/O space and steers the DMA and interrupt signals to different pins on the bus. This procedure also requires that system configuration files are created and updated to reflect these configurations.

This prior art configuration procedure presents problems; because, the end-user must have a fair understanding of computer system configuration procedures to effect some of these configuration changes. The user typically must resolve any system resource conflicts that result from any configuration by referring to documentation provided by the system and card manufacturers. This procedure can sometimes be frustrating and unreliable.

Prior art bus standards, such as Micro Channel Architecture (MCA) and Extended Industry Standard Architecture (EISA), have both hardware and software implementations to identify system resources requested by a card. However, user intervention is still required for the resolution of conflicts that arise during any reconfiguration of the circuit cards. These implementations are also not compatible with the installed base of PCs with ISA card slots.

In order to relieve the burden of users reading manuals to configure circuit cards, many prior art system designers provide software to help in the configuration of these circuit cards. However, the responsibility of resolving resource conflicts that result after a manual reconfiguration of these circuit cards is still left to the user.

Prior art systems have been unable to provide any hardware and software mechanism that will automatically configure these ISA circuit cards when inserted into Personal Computer systems. Therefore, a method and apparatus is needed that will enable these cards to be configured into a bus architecture based computers system, without the need for any user intervention. The use of these circuit cards should be such that the user simply has to plug (insert) the cards in a computer system, without any manual configurations or resource conflict resolutions by the system user. The system should automatically resolve resource conflicts between add-on circuit cards. This automatic conflict resolution should optimally allocate system resources between the add-on cards and other devices in the system without any user intervention. Prior art systems have been unable to achieve this level of automatic configuration.

SUMMARY OF THE INVENTION

A method and apparatus is disclosed for automatically configuring the circuit cards that plug into computer systems using a bus configuration, hence the name "plug and play" cards. The present method and apparatus enables system software to detect resources requested by such plug and play cards and also detect conflicts among requested resources to arbitrate any conflicts that might result.

By design, some plug and play cards are typically inactive after power-up so that a BIOS (Basic Input/Output System) or operating system software can selectively configure the card and maximize the success rate of booting (initializing) the system. For compatibility with existing ISA systems, other plug and play cards that participate in the boot process (i.e. input devices like keyboards, output devices like video controllers, and initial program load devices like SCSI or Integrated Drive Electronics (IDE) controllers) are active after power-up. This allows operating systems to boot up the system and configure non-boot devices.

To ensure the compatibility between present ISA installed computer systems and the present invention, the BIOS of such standard computers is modified. This modification enables the BIOS to isolate each plug and play card using a unique number on each card. The BIOS assigns a handle (a dynamically generated number between 1–256 generated by the processor) to each isolated plug and play card, which is used to select each plug and play card uniquely. The BIOS then checks to make sure that, at a minimum, the assignment of plug and play device resources that participate in the boot process in the computer system are conflict free.

After all the initialization is performed by the BIOS, the operating system of the computer system allocates the system resources to all the remaining plug and play cards by obtaining the plug and play information from the BIOS. The operating system then accesses the resources and arbitrates any resource conflicts.

The present invention also uses a set of commands executed using three 8 bit I/O ports. A sequence of data writes to one of the ports is used as the key to enable the plug and play logic on each card. This sequence is called the initiation key. The initiation key is used by the present invention to place the plug and play logic into a configuration mode.

All the plug and play cards of the present invention respond to the same I/O port addresses. Because the plug and play software requires an isolation mechanism to address one particular card at a time, the present invention uses an isolation protocol which uses a unique number on each card to isolate one plug and play card at a time. After each card is isolated, the plug and play software assigns each card a handle which is used to select that unique plug and play card during system boot-up initialization.

In the present invention, the configuration of the ISA cards is achieved using the command registers specified for each resource type. Because each card supports a read-only resource data structure which describes the resources supported and those requested by the functions on the cards, the concept of multiple functions per ISA card is supported.

Following each isolation, the software reads the resource data structure on each card. When all the resource capabilities and demands are known, a process of resource arbitration is invoked to determine resource allocation to each ISA card. The card is left in the in-active state, thereby permitting the dynamic resource balancing of the system.

Also, it is recognized that to use the present invention with existing ISA cards, some augmentation is required in the Basic Input/Output Operating System (BIOS) or operating system of the computer system to add the capability to identify and handle non-plug and play cards and the resources needed to eliminate or minimize the need for user intervention. Such augmentation also enables the system to manage and arbitrate ISA resources.

It is therefore an object of the present invention to provide a system and method of automatically configuring circuit cards for bus based computer systems.

It is another object of the present invention to provide a system that does not require an end-user to configure card or resource parameters.

It is further an object of the present invention to provide a system that can uniquely address any individual cards in the system even when two or more cards have the same I/O port address, the same resources, or similar attributes.

Another object of the present invention is to provide the ability to read a template on each circuit card, which identifies the current resource usage and configuration options for each system resource requested.

It is yet another object of the present invention to provide a system that will maintain a backward and forward compatibility between the plug and play ISA cards of the present invention, and existing ISA based personal computer systems.

Another object of the present invention is accomplished by the plug and play software which uses a set of commands executed using three 8 bit I/O ports. Because all plug and play cards respond to the same I/O port address, the present invention offers a means of isolating port address to a particular card, one at a time.

The foregoing and other objects, features and advantages of the present invention will be apparent from the following detailed description of the preferred embodiment of the present invention as illustrated by the accompanying drawings.

DETAILED DESCRIPTION OF THE INVENTION

A method and apparatus for automatically configuring circuit cards in a computer system is described. The following detailed description of the preferred embodiment is provided for purposes of explanation. Specific circuit devices, components, and processes are set forth in order to provide a thorough understanding of the present invention. However, it will be apparent to one of ordinary skill in the art that the present invention may be practiced without these specific details.

Figure 1:
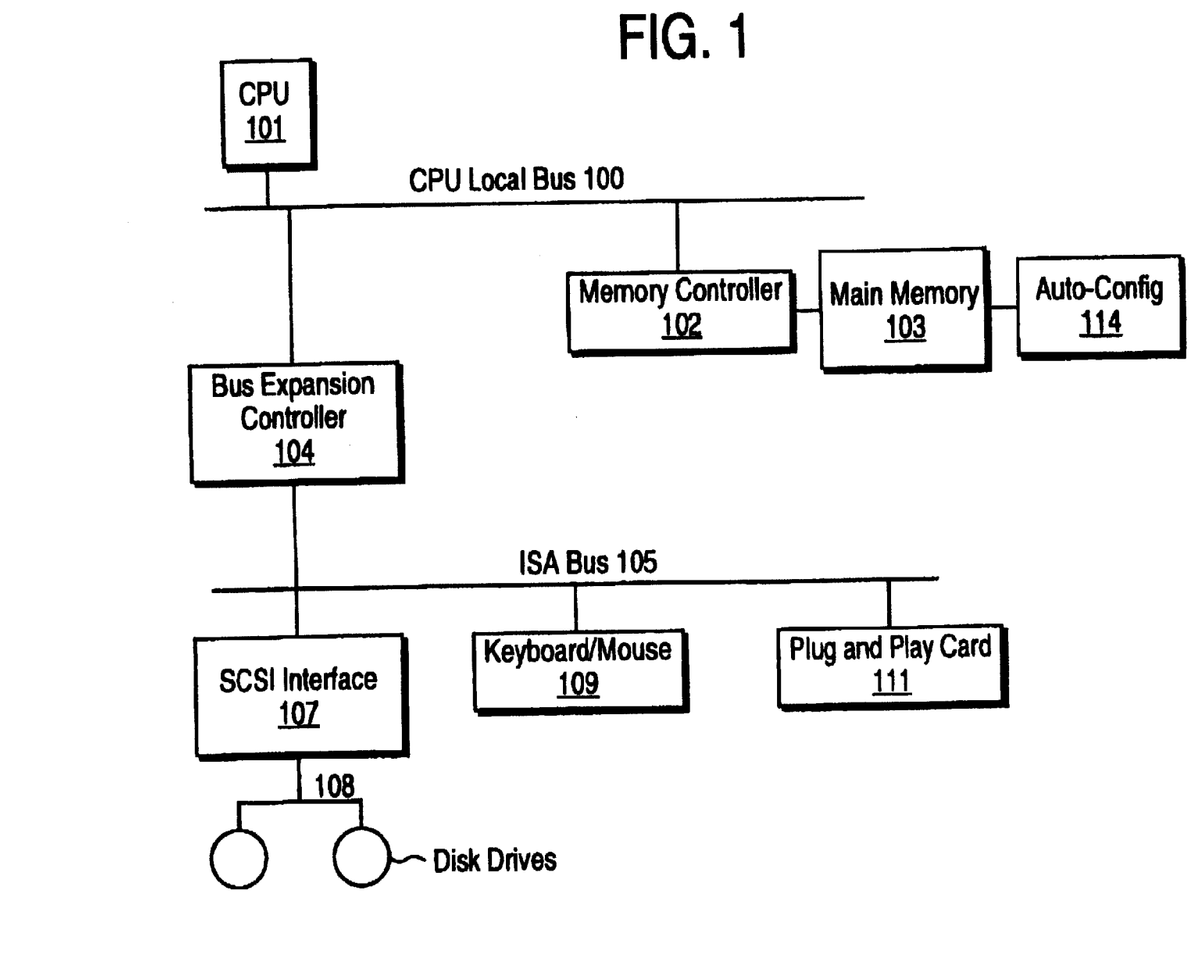
FIG. 1 is block diagram of a computer system of the present invention.

FIG. 1 is a block diagram illustrating the architecture of a computer system of the present invention. In general, such a computer system comprises a central processing unit (CPU) local bus 100 for communicating information. CPU 101 coupled to bus 100 for processing information. Memory controller 102 is coupled to bus 100 for managing memory access to main memory 103 by CPU 101.

The computer system of FIG. 1 also comprises bus expansion controller 104 also coupled to bus 100 for allowing CPU 101 to communicate with other peripheral resources of the computer system. Bus expansion controller 104 is also coupled to ISA bus 105. It will be apparent to those of ordinary skill in the art that a bus other than an ISA bus may equivalently be used. ISA bus 105 provides a communication medium between other resource peripherals of the computer system and CPU 101. SCSI adapter 107 couples to ISA bus 105 to allow small computer storage devices like disk drives, etc. to communicate with CPU 101. For example, SCSI adapter 107 couples to ISA bus 105 to allow small computer storage devices like disk drives, CD-ROM, tape, etc. to communicate with CPU 101. These devices are coupled to SCSI bus 108. An alphanumeric or other input device 109, including alphanumeric and other keys, etc. is coupled to ISA bus 105 to provide communication and command selection options to CPU 101. Both plug and play hardware and software capability is added to any card 111 coupled with ISA bus 105 to communicate user processes such as video, etc. to CPU 101. Auto-configuration logic 114 is shown coupled to main memory 103 to provide automatic configuration of the plug and play card 111 upon being coupled to the computer system, without any user intervention. This plug and play capability is described in detail below.

Figure 2:
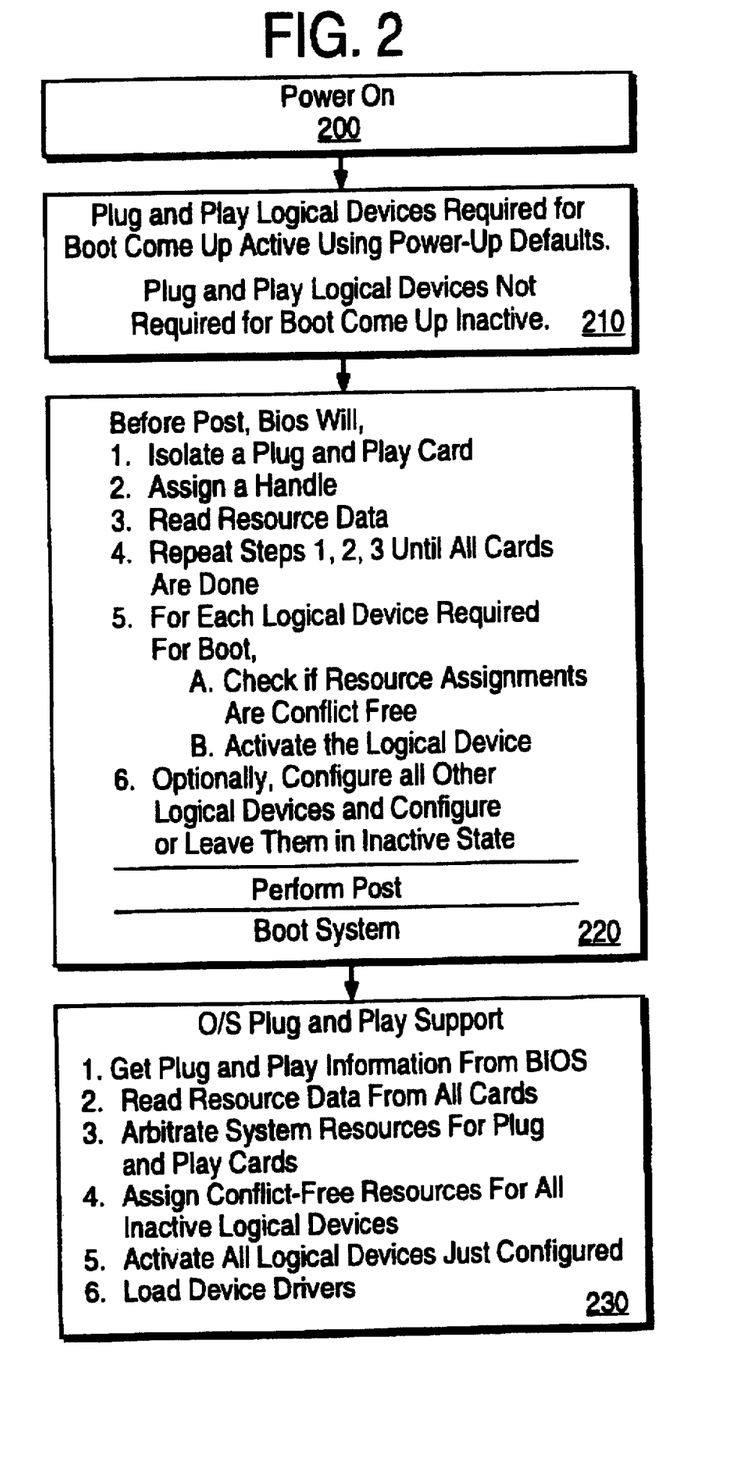
FIG. 2 is a plug and play ISA configuration flow diagram of the present invention.

FIG. 2 is a flow diagram illustrating the configuration process flow employing the teachings of the present invention. Power is applied to the system in block 200. At block 210, the plug and play logical devices, which are part of the plug and play registers on the plug and play cards, that participate in the boot process come up active using default power-up assignment on the card. Power-up assignment is part of the logic in the card control register described in FIG. 5B. Non-boot devices come up inactive. This step is well known in the prior art.

At block 220, the system BIOS, before performing a POST (power-on self test), isolates a plug and play card by dynamically assigning a handle to the card. The handle is stored in the plug and play card control register illustrated in FIG. 5B. The BIOS then reads the resource data from the plug and play card control register (FIG. 3A) of the plug and play card. This step is repeated until all the activated cards are read. The BIOS checks each logical device on each plug and play card to determine whether all the resource assignments are conflict free.

The plug and play card can request four different kinds of resources, namely memory, I/O, interrupt request (IRQ) lines, and the DMA channel in the computer system. For example, in a typical PC there are two 8237A type DMA controllers cascaded together yielding seven usable DMA channels. DMA channel 1 is normally assigned to SDLC and channel 2 is normally assigned to the floppy controller, leaving other channels available. If there are two plug and play cards issuing a request for a DMA channel that specifies use of any DMA channel (e.g., 0, 3, 5, 6, or 7), it is the responsibility of the entity (plug and play BIOS or operating system) configuring these devices to assign the device a unique or conflict-free DMA channel. This process of choosing one resource and assigning it uniquely to a card requires knowledge about what resources are already allocated or conversely what resources are free and then matching that information against the resource requests from a plug and play card. In the prior art, the process of selecting a resource for a card was left to the user. In the present invention, after checking the logical devices on the plug and play cards, the BIOS then activates the logical device. The BIOS, at this step, configures all other logical devices or leaves them in an inactive state. The BIOS performs the POST and boots the system.

At block 230, after boot up, the operating system gets the plug and play information, such as the number of plug and play cards in the computer system, from the BIOS. The operating system then reads all the resource data from all the cards. The operating system also arbitrates all system resources for the plug and play cards by building a list of available resources and assigning conflict-free resources for all active logical devices. The operating system then activates the device and loads the device drivers for these devices.

Figure 3A:
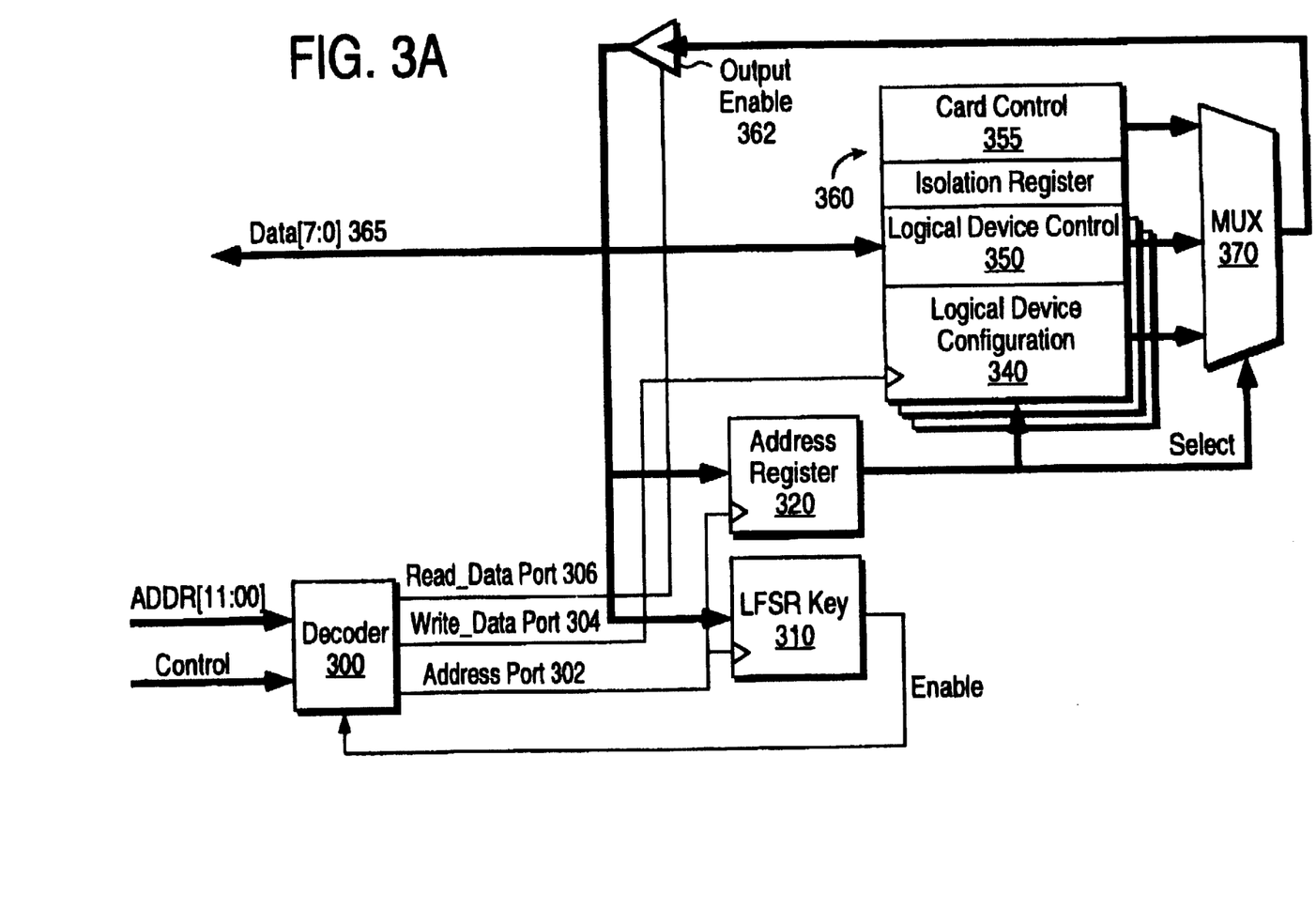
FIG. 3A is a logic flow diagram for the automatic configuration of plug and play cards.

Referring to FIG. 3A, a block diagram illustrates the hardware logic for the auto-configuration system residing on a play and play card of the present invention. Decoder 300 is shown coupled to the Linear Feedback Shift Register (LFSR) key 310 via ADDRESS port 302. Decoder 300 is a 12 bit decoder used by the present invention to decode the address for both reads and writes by the present invention.

Figure 3B:
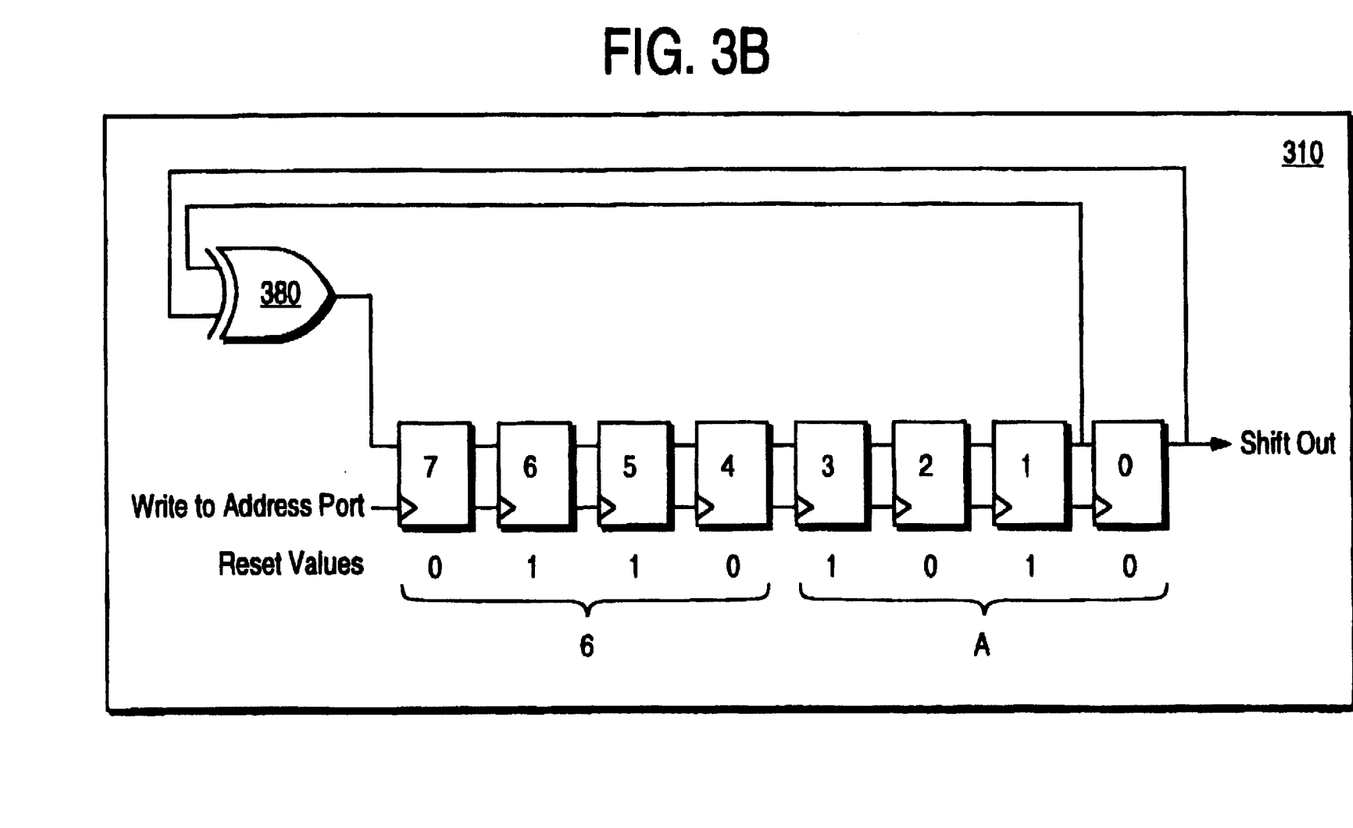
FIG. 3B is a block diagram of a Linear feedback shift register of the present invention.

LFSR 310, which is described in detail in FIG. 3B, is shown coupled to decoder 300. LFSR 310 is used by the present invention to generate data patterns needed to provide an initiation key for the plug and play card. The initiation key places the plug and play logic into a configuration mode whenever the computer system of the present invention is powered up. The initiation is done by a predefined series of writes to ADDRESS port 302. The write sequence is decoded by Decoder 300. If the proper series of input/output writes is detected, the plug and play auto-configuration ports (i.e. ADDRESS port 302, READ_DATA port 306 and WRITE_DATA port 304) are enabled. LFSR 310 is a hardware implementation check of the initiation key. LFSR 310 is described in detail in FIG. 3B.

Plug and play registers 360 are shown coupled to Mux 370 via data bus 365. Plug and play registers 360 comprise Card control register 355, which specifies the generic operation of the plug and play cards. Logical device register 350 specifies which logical device the plug and play cards use in the computer system of the present invention. Logical device configuration register 340 stores the current configuration of a logical device.

The information generated by plug and play registers 360 are multiplexed into Mux 370, which is shown coupled to output enable pin 362 via data bus 365. Mux 370 multiplexes all the information from the Plug and play registers 360 out to the Output enable pin 362 via data bus 365.

The plug and play software of the present invention which resides in main memory 103, uses three 8-bit ports to access the configuration logic on each plug and play card. These ports are the ADDRESS port 302, WRITE_DATA port 304, and READ_DATA port 306 as shown in FIG. 3A.

Configuration logic on the plug and play card is implemented as a set of 8-bit registers in plug and play registers 360. These registers are used by the software of the present invention to issue commands, check status, access the resource data information, and configure the Plug and play hardware.

The Plug and play cards access the ADDRESS port 302 by writing the address of the desired registers 360 to the ADDRESS port 302. The ADDRESS port 302 is also the write destination of the initiation key. The initiation key is described in detail below.

WRITE_DATA port 304 is used by the present invention to write data to the plug and play registers 360. The destination of the data is determined by the address written to the ADDRESS port 302.

READ_DATA port 306 is also used by the present invention to read data from the plug and play registers 360. The source of the data is determined by the last address written to the ADDRESS port 302. The address of READ_DATA port 306 is set by writing a register address to the plug and play registers 360. The isolation protocol of the present invention, which is described in detail in FIG. 4A, verifies that the location selected for the READ_DATA port 306 is free of conflict.

Plug and play registers 360 are accessed by first writing the address of the desired register to the ADDRESS port 302. This operation is followed by a step of reading data from the READ_DATA port 306 or writing data to WRITE_DATA port 304. A write data operation to ADDRESS port 302 may be followed by a plurality of WRITE_DATA or READ_DATA accesses to the same register location without the need to write the register address to the ADDRESS port 302 before each access.

Referring to FIG. 3B, the Linear Feedback Shift Register (LFSR) 310 is illustrated. LFSR 310 is used by the present invention to generate data patterns needed to provide an initiation key protocol and to provide a checksum verification during serial data read in the isolation protocol.

The LFSR 310 is an 8-bit shift register that resets to value 6A(Hex). The feedback taps for this shift register are taken from register bits LFSR [0] and LFSR [1]. The plug and play software generates the LFSR sequence and writes it to the ADDRESS port 302 as a sequence of 8-bit write cycles. The LFSR hardware compares the byte of write data with the value in the shift register at each write. If the data sent to the register does not match the value in the registers, the LFSR 310 will reset to an initial value of 6A(Hex). The plug and play software resets the LFSR 310 to its initial vale by a sequence of two write cycles of 0×00 to the ADDRESS port 302 before the initiation key is sent to the plug and play cards. The initiation key is sent to the plug and play cards of the present invention in a Wait for Key state by ensuring that the LFSR is in its initial state, then performing 32 writes to the ADDRESS port 302.

The 32 writes must be exactly equal to the 32 values the LFSR 310 generates starting from 6A(Hex). The LFSR 310 will reset to its initial state 6A(Hex) any time the plug and play card is in the Wait for Key state, and receives a write to the ADDRESS port 302 that does not match the value currently in the LFSR 310.

To ensure that the LFSR 310 is in the initial state, two write operations of value 00 are performed to the ADDRESS port 302 before sending the initiation key. To perform the initiation key, an initial value of 6A(Hex) is first written to the ADDRESS port 302. The next 31 values of the LFSR are converted by first determining the shift input for the next cycle which is LFSR[1] XOR LFSR[0]. This next cycle input value is generated by XOR gate 380 shown in FIG. 3B. The LFSR 310 is one bit to the right and the previously generated next cycle input value is stored in bit 7 of LFSR 310. This produces an initiation key in LFSR 310. This initiation key is written to the ADDRESS port 302 and repeated until all the plug and play cards are initialized.

Figure 3C:
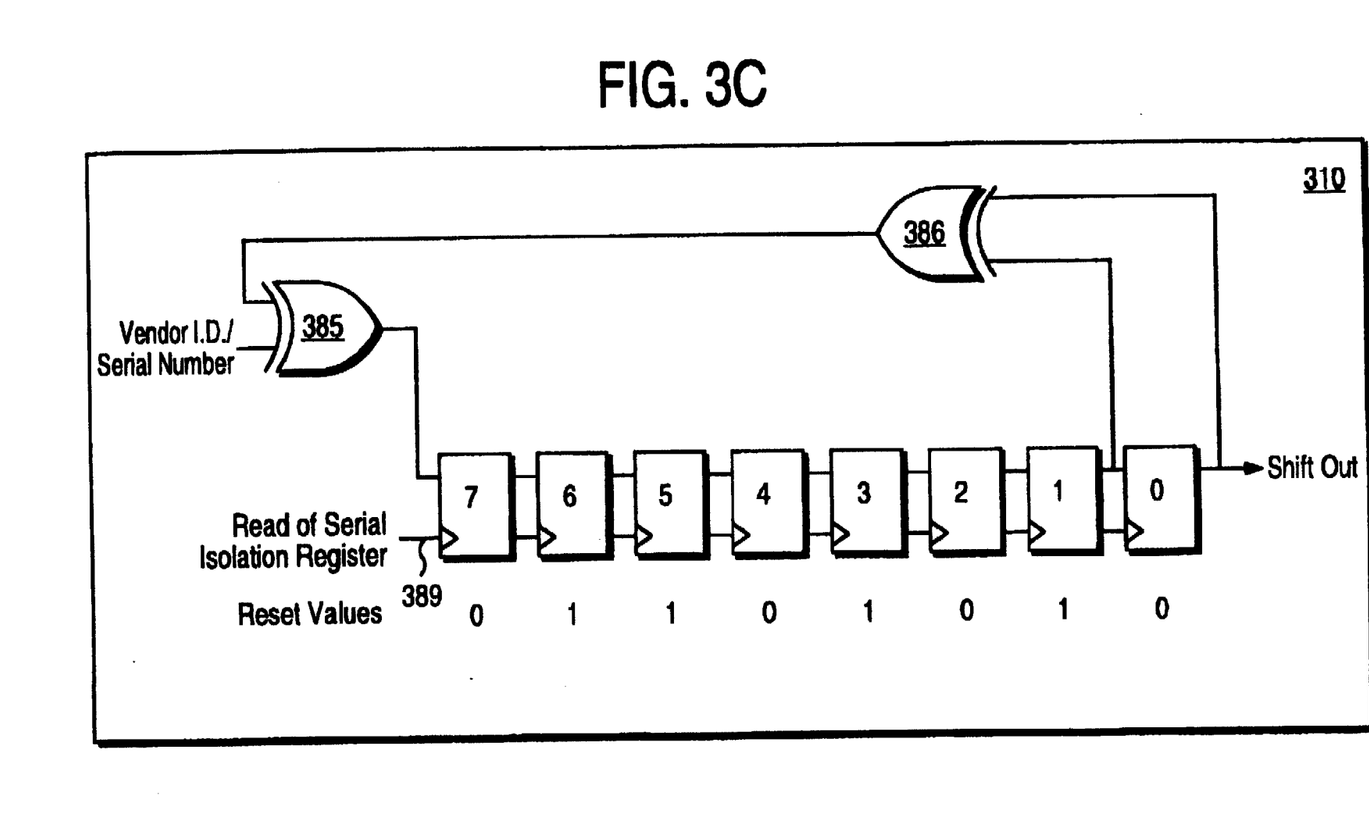
FIG. 3C is a block diagram of the checksum feature of the Linear feedback shift register of the present invention.

FIG. 3C is a block diagram illustrating the checksum function of the LFSR 310. Checksum verification is provided by the LFSR 310 during serial reads in the isolation protocol of the present invention. The checksum verification verifies that the data read is not corrupted. Explicit XOR gates 385 and 386 are shown coupled to the register bits 1, 0 and 7 of LFSR 310.

LFSR 310 resets to 6A(Hex) upon receiving a startup from the address decoder 300 on line 389. The next shift value for LFSR 310 is calculated as LFSR[1] XOR LFSR[0] XOR serial data which is the 64 bit Vendor ID and serial number. LFSR 310 is shifted right one bit at the conclusion of each pair of reads to the serial isolation register which is one of the registers in the card control register 355. LFSR[7] is assigned the next shift value. In a preferred embodiment of the present invention, if for example, a vendor with an abbreviation of "PXQ" and a manufacturer specific data field of 0443(Hex) and a serial number of 04000100(Hex). The following data pattern is generated by LFSR 310. A detailed description of how the Vendor IDs map to ASCII text is in FIG. 4B.

Vendor ID byte 0: 43(Hex)
Vendor ID byte 1: 11(Hex)
Vendor ID byte 2: 43(Hex)
Vendor ID byte 3: 04(Hex)
Serial No byte 0: 00(Hex)
Serial No byte 1 01(Hex)
Serial No byte 2: 00(Hex)
Serial No byte 3: 04(Hex).

The serial identifier is sent to LFSR 310 as follows:

| | |
|---|---|
| 0 × 43 (Bit 0 to Bit 7, 11000010) | |
| 0 × 11 | 10001000 |
| 0 × 43 | 11000010 |
| 0 × 04 | 00100000 |
| 0 × 00 | 00000000 |
| 0 × 01 | 10000000 |
| 0 × 00 | 00000000 |
| 0 × 04 | 00100000 |

LFSR 310 is reset to value 6A(Hex) when the Plug and play card 111 receives a Wake [CSN] command. After 64 pairs of reads (i.e. 32 bits of Vendor ID and 32 bits of serial numbers), the serial isolation register has a value of 18(Hex).

Figure 4A:
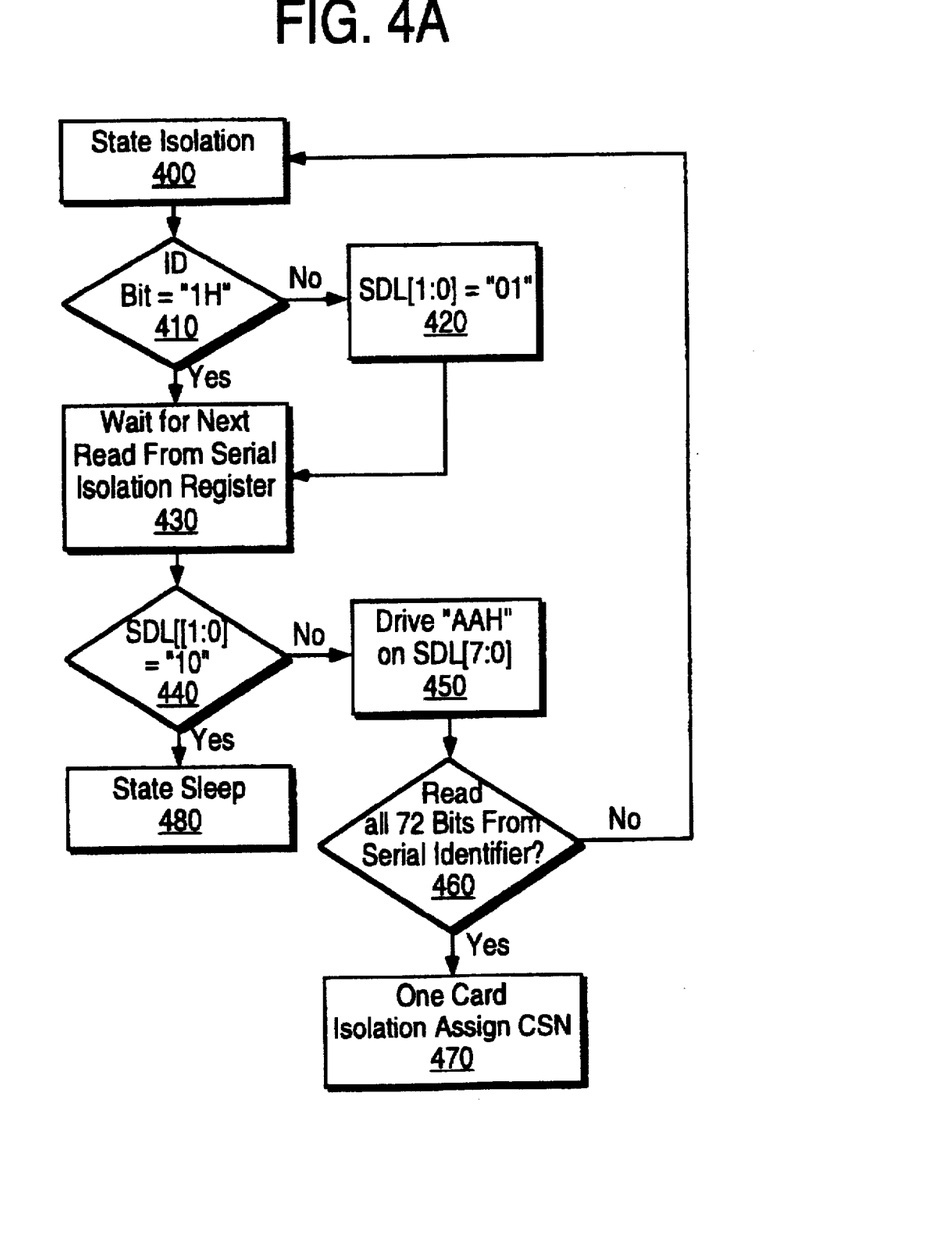
FIG. 4A is a diagram of the Plug and Play isolation process of the present invention.

FIG. 4A, is a flow diagram of the isolation process of the present invention. This process is used to isolate each plug and play card during system power-up. The isolation process uses signals on the ISA bus 105 and requires lock-step operations between the plug and play hardware and the isolation software. The key element of the isolation protocol of the present invention is that each plug and play card has an associated unique value referred to as the serial identifier.

Still referring to FIG. 4A, at block 400, the isolation state is invoked by the plug and play software. At this stage, the initiation key is sent to all plug and play cards thereby putting each card into a configuration mode. The circuitry on each plug and play card (as illustrated in FIG. 3A) expects 72 pairs of I/O read accesses to the READ_DATA port 306. The plug and play cards respond to reads depending on the value of each bit of the serial identifier.

At decision block 410, if the current bit in the serial identifier is a "1", block 415 is executed, the card drives 55(Hex) to complete the first I/O read cycle. If the current bit is not a "1", processing block 420 is executed. At processing block 420, if the current bit of the serial identifier is not a "1", the plug and play cards put the ISA data bus 105 of the present invention into a high impedance mode. All the cards in the high impedance mode check the ISA data bus 105 during the first I/O read cycle to sense if another card is driving the system data bus (SDL) to "01". If the SDL is being so driven, block 430 is executed.

At block 430, during the second I/O read, the cards that drove the 55 (hex) now drives a 0AA(hex). All high impedance cards now execute decision block 440. At decision block 440, the SDL is checked to see if it is being driven to "10". If SDL is not being driven by any plug and play card, block 450 is executed. However, if the SDL is being driven, all plug and play cards with current bit=0 go into a sleep state in block 480.

At block 450, all high impedance cards check the data bus to sense if another card is driving D[1:0] to "10"(binary). Since the high impedance card did not sense the data bus being driven, it prepares to drive the bus for the next pair of I/O reads.

At decision block 460, once the data bus is being driven by the plug and play card, the serial identifier of each card is checked to see if all 72 bits have been read. If all the bits have not been read, the process is repeated starting at block 400.

At block 470, one plug and play card remains after the isolation process; because, all cards that entered sleep state do not re-start in 400. This card is assigned a handle referred to as the Card Select Number (CSN). The CSN is an 8 bit register on each plug and play card. The CSN is defined as an 8 bit register to allow a wide variety of devices to manage their configuration and controls using the plug and play isolation process. The CSN is also defined such that all cards power-up with their CSN register set to 00. Once a card has been isolated, the CSN on that card is assigned a unique value. The value enables the plug and play software to select this card at later points in the configuration process without going through the entire isolation process.

Figure 4B:
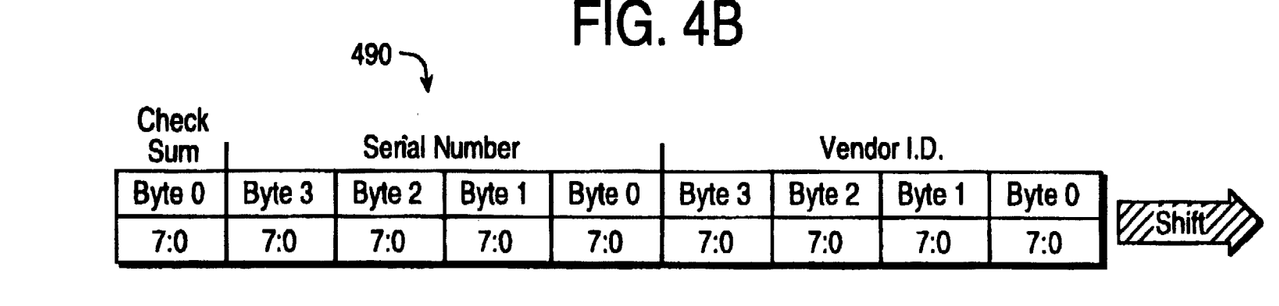
FIG. 4B is a block diagram of a serial identifier of the present invention.

FIG. 4B is a block diagram of the serial identifier of the plug and play cards of the present invention. Serial identifier 490 is a 72 bit unique non-zero number comprising two 32 bit fields and an 8 bit checksum field returned bit-wise by the plug and play devices in response to reads from the serial isolation register 355 in the preferred embodiment. The serial identifier facilitates in the selection of plug and play devices in a system. The first 32 bit field is a vendor identifier. This is an EISA ID and it consists of bits[16:0] which is a three character ASCII EISA-ID defined as 5 bits per character, "00001"="A"..."11010"="Z". Bits [31:16] is a manufacturer specific device code. The vendor ID field serves as a unique board identifier that allows plug and play card selection through the isolation process described earlier.

The second 32 bit field is the serial number of the present invention. The serial number is used only in the isolation process for selection of individual plug and play cards. This number differentiates between multiple cards with the same vendor ID when they are plugged into the same computer system. The serial number must be unique in order to support multiple cards with the same vendor ID in one system. In the preferred embodiment of the present invention, only one instance of a vendor ID is supported in a system.

The checksum field occupies the last 8 bits of serial identifier 490. This field is used to ensure that no conflicts have occurred while reading the device identifier information. The checksum generation was described above for the LFSR 310 checksum function (FIG. 3c).

Figure 5A:
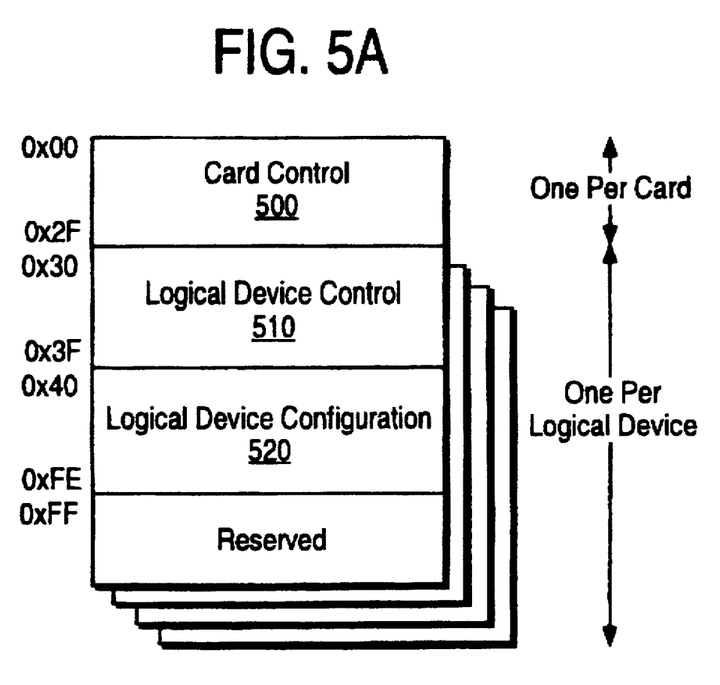
FIG. 5A is a block diagram of a high level plug and play register map setting of the present invention.

FIG. 5 is a block diagram showing a high level plug and play register map. The standard plug and play card register space is divided into three main parts: card control 500, logical device control 510, and logical device configuration 520. There is exactly one of each card control register on each plug and play card. Card control register 500 is used for global functions that control the entire card. The card control register of the present invention occupies memory address space location 00(Hex) to 2F(Hex).

Logical device control registers 510 control device functions such as enabling the device onto the ISA bus 105. Logical device control 510 occupies address space 30(Hex) through 3F(Hex). Logical device configuration registers 520 are used by the plug and play card to program the ISA bus 105 resource usage of the card. Logical device configuration register 520 occupies address location 40(Hex) through FE(Hex). Reserve register 530 of the present invention is reserved and is not used by the plug and play card.

The present invention responds to commands written to the plug and play registers 360 as well as certain ISA bus 105 conditions. Some of the commands of the present invention are described below. The following commands are not exclusive. It will be apparent to those of ordinary skill in the art that other commands for specific applications could easily be implemented.

RESET_DRV:

This is the ISA bus reset signal. When a card of the present invention detects this signal, it enters a Wait for key state. All CSNs are reset to 00 (Hex). The configuration registers for all logical devices are loaded with their power-up values from non-volatile memory or jumpers. All non-boot logical devices become inactive. Boot devices become active using their power-up ISA resources.

Configuration control register:

The configuration control register consists of three independent commands which are activated by writing a "1" to their corresponding register bits. These bits are automatically reset to "0" by the hardware after the commands execute.

Reset Command:

The reset command is sent to the plug and play cards, by writing a value of 01 (Hex) to the configuration control register. All plug and play cards in any state, except for Wait for key state, respond to this command. This command performs a reset function on all logical devices. This resets the contents of configuration registers to their default state. The configuration registers for all logical devices are loaded with their power-up values from non-volatile memory or jumpers. The CSN and plug and play state are preserved.

Wait for key command:

This command is sent to the plug and play cards by writing a value of 02(Hex) to the configuration control register. All cards of the present invention respond to this command. This command forces the plug and play cards to enter the Wait for key state. The CSNs of the Plug and play cards are preserved and no logical device status is changed.

Reset CSN command:

This command is sent to the plug and play cards by writing a value of 04(Hex) to the configuration control register. All plug and play cards in any state except Wait for Key state reset their CSN to 0.

Wake[CSN] command:

This command is issued to plug and play ISA cards currently in a sleep state. The sleep state is a state when the ISA cards are idle. The Wake command forces a plug and play card to enter the isolation state or the configuration state. A wake [CSN] command with a parameter of zero will force all cards without a CSN to enter the isolation state. A Wake[CSN] command with a parameter other than zero will force a card with a matching CSN to enter the configuration state. Any card in the isolation or configuration state that receives a Wake[CSN] command with a parameter that does not match its CSN will transition to sleep state.

Logical device register:

The logical device number register is used to select which logical device upon which the following configuration commands will operate.

I/O range check registers:

these registers allow the plug and play software to determine if another card conflicts with the I/O port range that has been assigned to a logical device. The I/O ranges that would be used by a logical device return 55(Hex) then AA(Hex) on I/O read commands. The plug and play software performs reads to all the ports that would be used by the logical device and verifies that the correct data is returned. If a conflict is detected, the plug and play software relocates the I/O range of the logical device to a new location.

Setting bit[1] of the register enables the I/O range check logic. Setting bit[0] forces the logical device to respond to I/O range with the value 55(Hex). If bit[0] is cleared, the logical device responds to reads within its assigned I/O range with the value of AA(Hex). This function of the present invention, operates only when bit[O] of the activate register is not set.

Activate register:

The activate register is a read/write register that is used to activate a logical device. An active logical device responds to all ISA bus cycles as per its normal operation. An inactive logical device does not respond to nor drive any ISA bus signals. Bit[0] is the active bit, if it is set to "1", the logical device is active; otherwise, it is inactive.

Figure 5B:
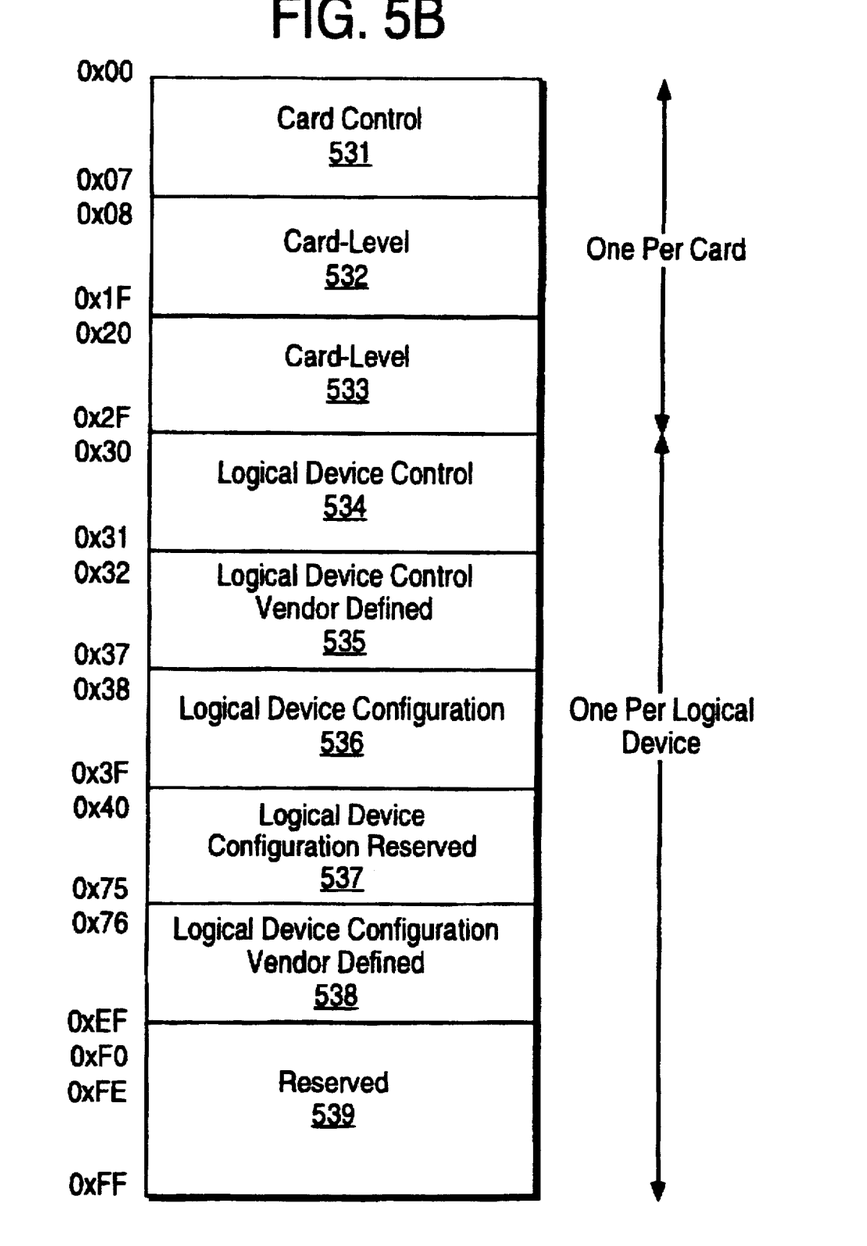
FIG. 5B is a block diagram of a detailed plug and play register map of the present invention.

FIG. 5B is a block diagram illustrating a detail level plug and play register map. This shows the order of the card registers and the logical device registers. The card registers of the present invention, as noted earlier, are unique for each card. However, the logical device registers are repeated for each logical device on the plug and play card. The following table describes the plug and play card-level registers and logical device registers.

| NAME | Address Port Value | Definition |
| --- | --- | --- |
| Set RD_DATA Port | 0x00 | Writing to this location modifies the address of the port used for reading from the plug and play ISA cards. Bits[07:00] becomes I/O read port address bit[09:02]. Reads from the register are ignored |
| Serial Isolation | 0x01 | A read to this register causes a plug and play |

| NAME | Address Port Value | Definition |
|---|---|---|
| Config Control | 0x02 | card in the isolation state to compare one bit of the board's ID. the register is read only. Bit[0]- Reset all logical devices and restore configuration registers to their power-up values Bit[1]- Return to Wait for Key state. Bit[2]-Reset CSN to 0 A write to bit[0] of this register performs a reset function on all logical devices. This resets the contents of configuration registers to their default state. All card's logical devices enter their default state and the CSN is preserved A write to bit[1] of the register causes all cards to enter the Wait for key state but all CSNs are preserved and logical devices are not affected. A write to bit[2] causes all cards to reset their CSN to zero. This register is write-only. |
| Wake[CSN] | 0x03 | A write to this port will cause all cards that have a CSN that matches the write data [7:0] to go from the sleep state to either the Isolation state if the write data for this command is zero or configuration state if the write data is not zero. This register is write-only. |
| Resource Data | 0x04 | A read from this address reads the next byte of resource information. The status register must be polled until bit[0] is set before this register may be read. This register is read-only |
| Status | 0x05 | Bit[00] when set indicates it is okay to read the next data byte from the Resource Data register. This register is read- only. |
| Card Select Number | 0x06 | A write to this port sets a card's CSN. The CSN is a value uniquely assigned to each ISA card after the serial identification process so that each card may be individually selected during a Wake[CSN] command. This register is read/write. |
| Logical Device Number | 0x07 | Selects the current logical device. All reads and writes of memory, I/O, interrupt and DMA configuration information access the registers of a logical device written here. In addition, the I/O Range check and activate commands operate only on the selected logical device. The register is read/write. If a card has only one logical device, this location should be a read-only value of 0x00. |
| Card level Reserved | 0x08–0x1F | Reserved for future use. |
| Card level, Vendor Defined | 0x20–0x2F | Vendor Defined. |

Figure 6:
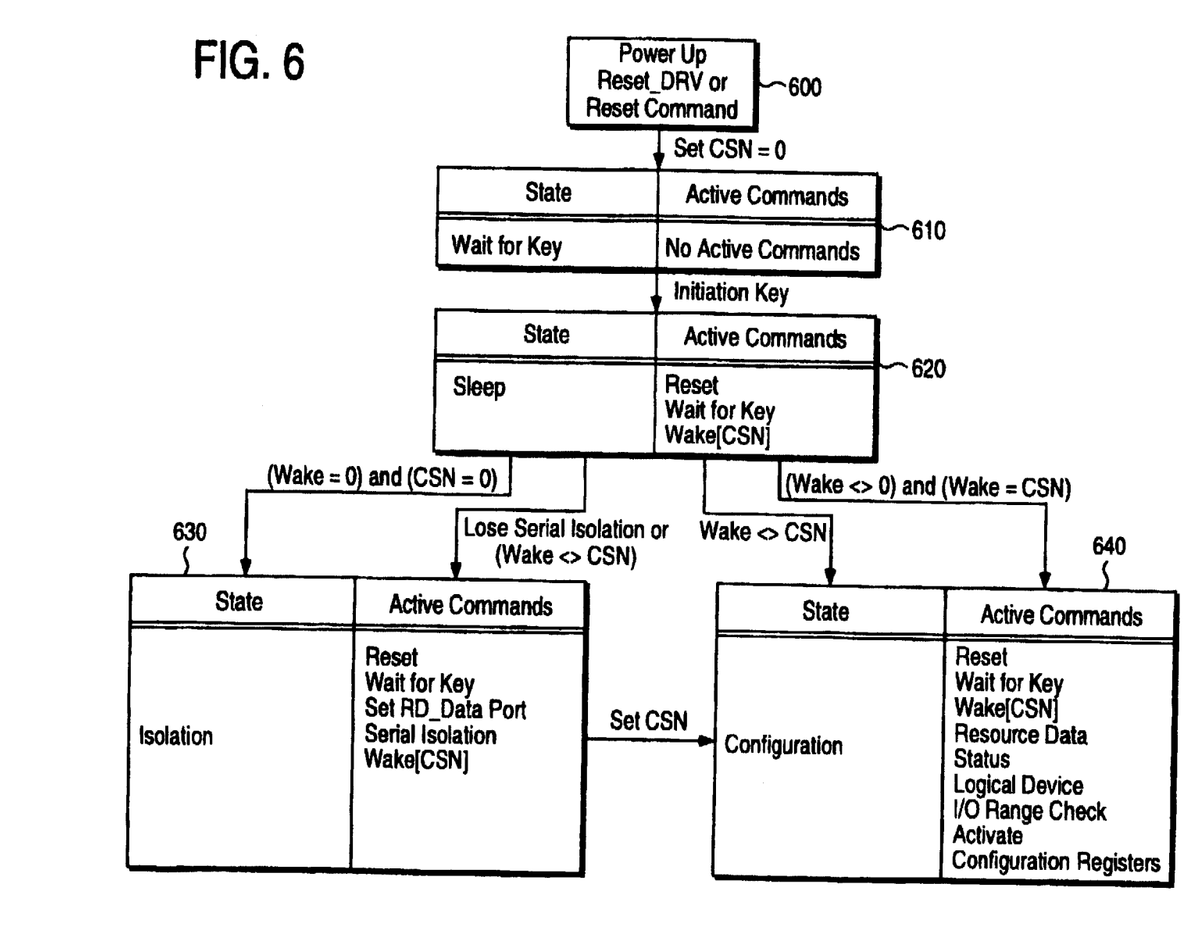
FIG. 6 is a block diagram illustrating the plug and play card state transition.

FIG. 6 is flow diagram illustrating an isolation sequence of the present invention. At block 600, on power-up of the computer system of the present invention, the plug and play cards detect RESET_DRV, the cards set their CSN to 0 and enter a Wait for key state. In a preferred embodiment of the present invention, a 2 msec delay is required from either a RESET_DRV or RESET command to a plug and play port access to allow a card to load initial configuration information from a non-volatile device.

At block 610, the plug and play cards enter a Wait for key state. In this state, the plug and play cards do not respond to any access to their auto-configuration ports until the initiation key is detected. Inactive plug and play cards also ignore all ISA accesses.

At block 620, when the plug and play cards receive an initiation key from the Wait for key state, the plug and play cards enter a sleep state. In the sleep state, the plug and play cards listen for a Wake[CSN] command with the write data set to 0×00 the default power-up setting of the CSN. The Wake[CSN] command sends all plug and play cards into the isolation state and resets the serial identifier/resource data pointer to the beginning. The Wake[x] command is used as a trigger to reset the resource data pointer.

At block 630, the plug and play cards enter an isolation state. At this state, the serial isolation register is read to isolate a card. If the checksum read from this card is valid, the card is isolated. The isolated card remains in the isolation state while all other cards have failed the isolation protocol and have returned to the sleep state. The CSN on the isolated card is set to a unique number [FIG. 3c].

At block 640, after the CSN of the isolated plug and play card has been set, the plug and play card transitions into a configuration state. On the next Wake[0] command, the card transitions to sleep state. This entire process of isolation is repeated until no more plug and play cards are detected by the computer system.

Reading Resource Data of the Present Invention:

Card resources may be only read from the plug and play cards in the configuration state. A card may get to configuration state by one of two different methods. A card enters the configuration state in response to the card "winning" the serial isolation protocol and having a CSN assigned. The card also enters the configuration state in response to receiving a Wake[CSN] command that matches the plug and play card's CSN.

Card resource data is read by first polling the status register and waiting for bit[0] to be set. When this bit is set it means that one byte of resource data is ready to be read from the Resource Data register. After the Resource Data register is read, the Status register must be polled before reading the next byte of resource data. This process is repeated until all resource data is read.

Whereas many alterations and modifications of the present invention will no doubt become apparent to a person of ordinary skill in the art after having read the foregoing description, it is to be understood that the particular embodiment shown and described by way of illustration are in no way intended to be considered limiting. Therefore, reference to the details of the preferred embodiments are not intended to limit the scope of the claims which themselves recite only those features regarded as essential to the invention.

Thus, a method and apparatus for automatically configuring ISA plug and play cards has been described.

What is claimed is:

1. In a computer system having a bus, a processor coupled to the bus, and the system resources coupled to the bus, a self configuring circuit card comprising:

an interface operative to enable removable coupling of said circuit card to said bus;

at least one card resource resident on said circuit card, said circuit card further including readable card resource information resident on said circuit card, said readable card resource information including information describing attributes of said card resource; and auto-configuration logic resident on said circuit card for self configuring said circuit card when said interface is removably coupled to said bus, said auto-configuration logic further including arbitration logic for reading said readable card resource information and for resolving conflicts between said system resources and said card resource by assigning to each card an individual identification.

2. The self configuring circuit card of claim 1 wherein said auto-configuration logic further comprises initialization logic for placing said circuit card into a configuration mode upon coupling of said circuit card to said bus.

3. The self configuring circuit card of claim 2 wherein said initialization logic includes initialization keys further comprising linear feedback shift registers for initializing said circuit card.

4. The self configuring circuit card of claim 2 further comprising a card selector for selectively coupling said circuit card to said bus, said initialization logic further including logic for automatically setting said card selector.

5. The self configuring circuit card of claim 1 further including a plurality of storage locations for storing said readable card resource information on said circuit card.

6. The self configuring circuit card of claim 5 wherein said plurality of storage locations further includes logical device registers for storing configuration information for configuring said circuit card.

7. The self configuring circuit card of claim 5 wherein said plurality of storage locations further includes control registers for storing card identification information which uniquely identifies said circuit card in said computer system.

8. The self configuring circuit card of claim 5 wherein said plurality of storage locations further includes command registers for storing information describing attributes of said self configuring circuit card.

9. The self configuring card of claim 2, wherein said auto configuration logic circuit further includes logic for reorganizing unique handles assigned by the processor to at least one other circuit card, said auto configuration logic further assigning to the self configuring card a unique handle different from handles assigned to other circuit card.

10. The self configuring card of claim 9, wherein the auto configuration logic assigns a unique handle to the self configuring card in parallel with the auto configuration logic resident on a different self-configuring circuit card.

11. The self configuring circuit card of claim 2, wherein the card resource information is configured before POST.

12. The self configuring circuit card of claim 2, wherein said circuit card is compatible with ISA cards.

13. The self-configuring circuit card of claim 2, wherein said card resource receives information from or provides information to BIOS or system software.

14. A computer system comprising:

a bus for communicating information;

a processor, coupled to said bus, for processing data instructions;

system resources coupled to said bus; and a self configuring circuit card including:

a.) an interface operative to enable removable coupling of said self configuring circuit card to said bus, b.) at least one card resource resident on said circuit card, said at least one card resource including video, sound, storage, or input/output resources to said computer system, c.) readable card resource information resident on said circuit card, said card resource information including information describing attributes of said at least one card resource, and d.) auto-configuration logic circuit resident on said circuit card for self configuring said circuit card when said circuit card is removably coupled to said bus, said auto-configuration logic further including arbitration logic for reading said card resource information and for resolving conflicts between said system resources and said at least one card resource by assigning to the card a unique identification.

15. The computer system of claim 14 wherein said auto-configuration logic circuit further includes isolation logic used in the process of identifying said circuit card in said computer system during initialization, said isolation logic further including logic for placing said circuit card in an active or inactive state after being initialized.

16. The computer system of claim 14 wherein said auto-configuration logic circuit further includes logic for recognizing unique handles assigned by said processor to said circuit card, said auto-configuration logic circuit further includes logic for activating a configuration space in said circuit card without isolating said circuit card during initialization of said circuit card in said computer system.

17. The computer system of claim 14 wherein said auto-configuration logic circuit further includes logic for dynamically assigning a unique handle to said self configuring circuit card, said auto-configuration logic circuit further includes logic for recognizing said unique handle when said circuit card is activated.

18. The computer system of claim 14, wherein self configuring occurs in parallel with any self configuring of any other circuit cards in the computer system.

19. The computer system of claim 14, wherein the card resource information is configured before POST.

20. The computer system of claim 14, wherein said circuit card is compatible with ISA cards.

* * * * *

UNITED STATES PATENT AND TRADEMARK OFFICE
CERTIFICATE OF CORRECTION

PATENT NO. : 5,768,542
DATED : June 16, 1998
INVENTOR(S) : Enstrom et al.

It is certified that error appears in the above-identified patent and that said Letters Patent is hereby corrected as shown below:

In the Title Page at [75] delete "Ralph L. Lipe"
and insert --Ralph A. Lipe--

Signed and Sealed this

Thirtieth Day of January, 2001

Attest:

Q. TODD DICKINSON

*Attesting Officer*  *Director of Patents and Trademarks*